US008796962B2

(12) United States Patent
Murata et al.

(10) Patent No.: US 8,796,962 B2
(45) Date of Patent: Aug. 5, 2014

(54) DRIVE UNIT, IMAGE FORMING APPARATUS INCORPORATING SAME, PERIPHERALS INCORPORATING SAME, AND CONTROL METHOD THEREFOR

(75) Inventors: Takuya Murata, Tokyo (JP); Shogo Sakamoto, Kanagawa (JP); Kenji Tomita, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 481 days.

(21) Appl. No.: 13/067,940

(22) Filed: Jul. 8, 2011

(65) Prior Publication Data

US 2011/0266990 A1 Nov. 3, 2011

(30) Foreign Application Priority Data

Jul. 27, 2010 (JP) ................................. 2010-168368
Mar. 18, 2011 (JP) ................................. 2011-060078

(51) Int. Cl.
*H02P 6/00* (2006.01)

(52) U.S. Cl.
USPC ............ 318/400.01; 318/400.37; 318/400.38; 318/721; 318/799; 318/437

(58) Field of Classification Search
USPC .......... 318/400.01, 400.07, 400.14, 721, 799, 318/430, 432, 560, 599, 400.37, 400.38; 388/909, 842
See application file for complete search history.

(56) References Cited

U.S. PATENT DOCUMENTS

| | | | | |
|---|---|---|---|---|
| 6,713,983 B2 * | 3/2004 | Maruyama | ..................... | 318/560 |
| 7,579,795 B2 * | 8/2009 | Komatsu et al. | ........... | 318/254.1 |
| 7,929,894 B2 | 4/2011 | Murata et al. | | |
| 8,081,904 B2 * | 12/2011 | Ohkubo et al. | ............... | 399/162 |
| 2005/0168187 A1 * | 8/2005 | Uchiyama et al. | ............ | 318/772 |
| 2009/0017953 A1 | 1/2009 | Uehara et al. | | |
| 2009/0169225 A1 | 7/2009 | Murata et al. | | |
| 2009/0169259 A1 | 7/2009 | Ebara et al. | | |
| 2009/0190972 A1 | 7/2009 | Ohkubo et al. | | |
| 2009/0238613 A1 | 9/2009 | Ueda et al. | | |
| 2009/0263158 A1 | 10/2009 | Murata et al. | | |

FOREIGN PATENT DOCUMENTS

| | | |
|---|---|---|
| JP | 60176477 A | 9/1985 |
| JP | 9149685 A | 6/1997 |
| JP | 2002010664 A | 1/2002 |
| JP | 2002186273 A | 6/2002 |
| JP | 3503429 B2 | 12/2003 |

OTHER PUBLICATIONS

Abstract of JP-11-027986, published on Jan. 29, 1999.

* cited by examiner

*Primary Examiner* — Antony M Paul
(74) *Attorney, Agent, or Firm* — Harness, Dickey & Pierce, P.L.C.

(57) ABSTRACT

A drive unit, which can be included in an image forming apparatus with peripherals disposed thereto and use a control method therefore, includes an inner rotor brushless DC motor, a driver, a rotation detector, and a controller. The driver supplies power to drive the brushless DC motor. The rotation detector detects an amount and direction of rotations of an output shaft. The controller controls the rotations of the brushless DC motor and obtains a target drive signal of the brushless DC motor externally and a detection signal from the rotation detector and outputs a signal to the driver. The controller controls a speed of rotation of the brushless DC motor by varying the signal output to the driver based on the target drive signal and the detection signal.

12 Claims, 10 Drawing Sheets

DRIVE UNIT, IMAGE FORMING APPARATUS INCORPORATING SAME, PERIPHERALS INCORPORATING SAME, AND CONTROL METHOD THEREFOR

CROSS-REFERENCE TO RELATED APPLICATIONS

The patent application is based on and claims priority pursuant to 35 U.S.C. §119 from Japanese Patent Application No. 2010-168368, filed on Jul. 27, 2010 in the Japan Patent Office, and Japanese Patent Application No. 2011-060078, filed on Mar. 18, 2011 in the Japan Patent Office, the entire disclosure of which are hereby incorporated herein by reference.

BACKGROUND OF THE INVENTION

1. Field of the Invention

Embodiments of the present invention relate to a drive unit, an image forming apparatus such as a copier, facsimile machine, printer and so forth, incorporating the drive unit therein, peripherals disposed to the image forming apparatus and incorporating the drive unit therein, and a control method for the drive unit.

2. Description of the Related Art

Related-art image forming apparatuses have employed a stepping motor as a drive source that enables accurate position control, speed control, and hold control using pulse signals required by many parts of the image forming apparatus, such as a registration portion, a sheet conveyance portion, and an image reading portion.

The stepping motor is advantageous in that the position control, speed control, and hold control can be performed using pulse signals. However, since an excessive amount of torque needs to be applied due to the possibility of occurrence of misstep due to load fluctuation and speed change, energy efficiency can deteriorate and a bigger motor that can output power beyond the actual load may be required, and therefore it is inevitable that the motor becomes large and heavy.

By contrast, a direct current (DC) motor is highly efficient because the DC motor runs on direct current according to load amount. On the other hand, however, a single DC motor cannot achieve the accurate position control and hold control of a stepping motor.

Nevertheless, Japanese Patent No. 3503429 (JP-3503429-B) discloses a technique for controlling DC motors that provides a motor control unit that includes a pulse width modulator that outputs pulse signals including a predetermined duty, a DC motor to rotate in a predetermined direction via a bridge circuit based on the pulse signals output from the pulse width modulator, and a control unit to detect whether or not the DC motor is rotating and in which direction the DC motor is rotating based on the output from an encoder. Based on the detection results, the motor control unit adjusts the duty of the pulse signals in the pulse width modulator for the purpose of maintaining a stop of rotation of the DC motor, using the DC motor to perform position control, speed control, and hold control.

However, the technique disclosed in JP-3503429-B cannot make the DC as responsive as a stepping motor at acceleration and deceleration, and does not take the durability of the motor into account.

SUMMARY OF THE INVENTION

The present invention describes an image forming apparatus. In one example, a novel image forming apparatus includes an inner rotor brushless DC motor having an output shaft, a driver to supply power to drive the inner rotor brushless DC motor, a rotation detector to detect an amount of rotation and a direction of rotation of the output shaft, and a controller to control rotation of the inner rotor brushless DC motor. The controller obtains a target drive signal of the inner rotor brushless DC motor externally and a detection signal from the rotation detector. The controller outputs a signal. The controller controls a speed of rotation of the inner rotor brushless DC motor by varying the signal output to the driver based on the target drive signal and the detection signal.

The controller may obtain a target number of revolutions per unit time and a target total number of revolutions based on the target drive signal and obtain a number of motor revolutions per unit time and a total number of motor revolutions based on the detection signal. The controller may control at least one of the speed of rotation and a position of rotation of the inner rotor brushless DC motor by varying the signal output to the driver to cause the target number of revolutions per unit time to be equal to the number of motor revolutions per unit time and to cause the target total number of revolutions to be equal to the total number of motor revolutions.

The driver may be a four-quadrant driver.

The rotation detector may be a two-channel rotary encoder provided with an encoder disk having no more than 200 pulses per cycle.

The number of pulses per cycle of the encoder disk may be one of 12×N pulses and 50×N pulses, where N is a natural number.

The encoder disk may be made of a metallic material.

The encoder disk may have slit-shaped scales formed thereon and the rotation detector detects an amount of movement thereof by detecting the slit-shaped scales.

The above-described drive unit may further include a drive transmission unit attached to the output shaft of the inner rotor brushless DC motor. The rotation detector may be disposed at a side opposite a side to which the drive transmission unit attached and the encoder disk is fixedly mounted on the output shaft of the inner rotor brushless DC motor.

The output shaft of the inner rotor brushless DC motor may be supported by ball bearings.

The inner rotor brushless DC motor may use a Hall integrated circuit.

The output shaft of the inner rotor brushless DC motor may include gear teeth.

In another example, a novel image forming apparatus includes the above-described drive unit.

In another example, a novel peripheral device is disposed to an image forming apparatus and includes the above-described drive unit.

In another example, a control method for a drive unit includes supplying power to drive an inner rotor brushless DC motor, detecting an amount of rotation and a direction of rotation of the output shaft of the inner rotor brushless DC motor provided in the drive unit, obtaining a target drive signal of the inner rotor brushless DC motor externally and a detection signal, outputting a signal, and varying the output signal based on the target drive signal and the detection signal.

The varying step may include obtaining a target number of revolutions per unit time and a target total number of revolutions based on the target drive signal, obtaining a number of motor revolutions per unit time and a total number of motor revolutions based on the detection signal, causing the target number of revolutions per unit time to be equal to the number of motor revolutions per unit time, and causing the target total number of revolutions to be equal to the total number of motor revolutions.

BRIEF DESCRIPTION OF THE DRAWINGS

A more complete appreciation of the invention and many of the advantages thereof are obtained as the same becomes better understood by reference to the following detailed description when considered in connection with the accompanying drawings, wherein.

DETAILED DESCRIPTION OF THE INVENTION

Figure 1:
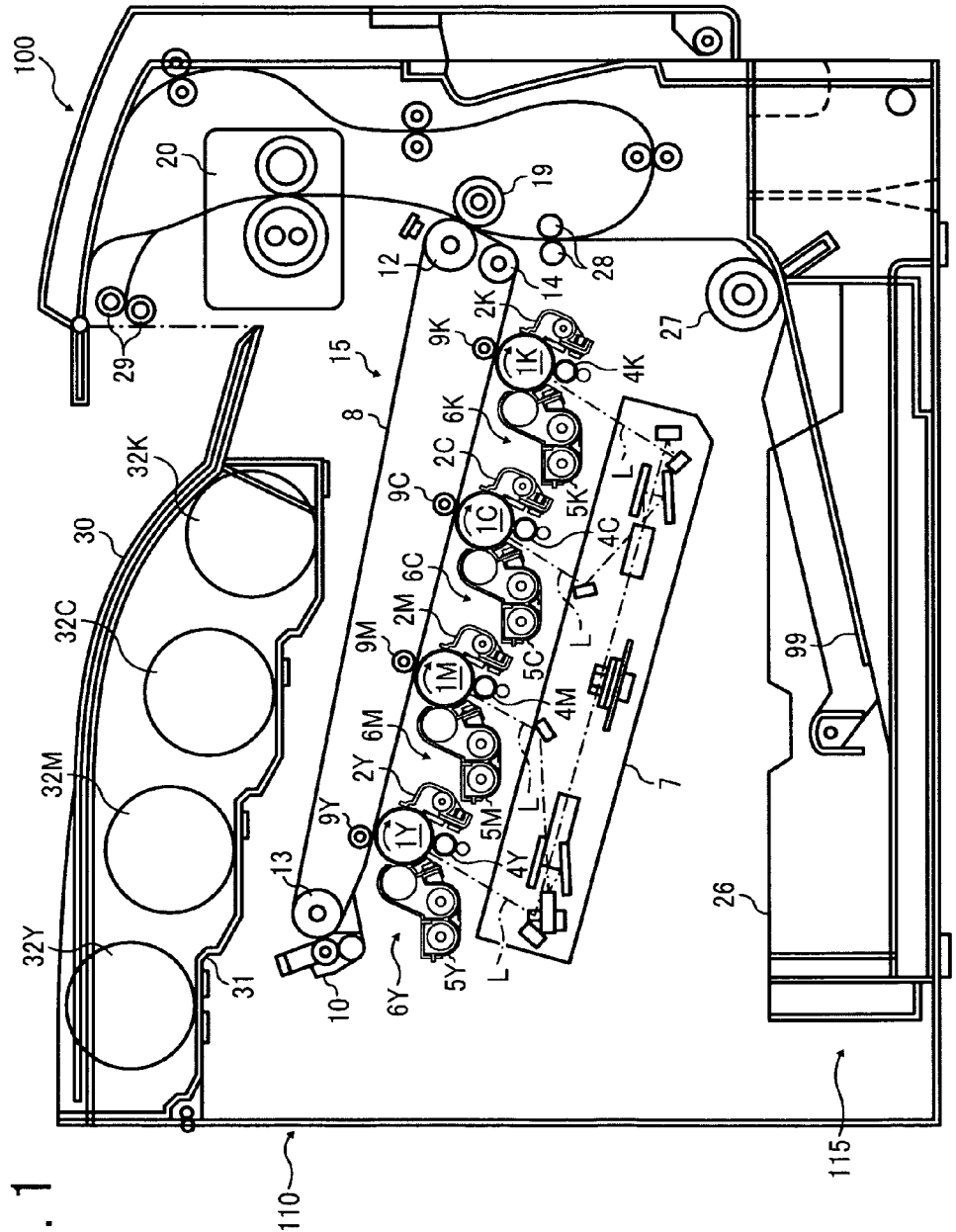
FIG. 1 is a diagram illustrating a schematic configuration of an image forming apparatus according to an embodiment of the present invention.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another-element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to the present invention. Elements having the same functions and shapes are denoted by the same reference numerals throughout the specification and redundant descriptions are omitted. Elements that do not require descriptions may be omitted from the drawings as a matter of convenience. Reference numerals of elements extracted from the patent publications are in parentheses so as to be distinguished from those of exemplary embodiments of the present invention.

The present invention includes a technique applicable to any image forming apparatus, and is implemented in the most effective manner in an electrophotographic image forming apparatus.

In describing preferred embodiments illustrated in the drawings, specific terminology is employed for the sake of clarity. However, the disclosure of the present invention is not intended to be limited to the specific terminology so selected and it is to be understood that each specific element includes all technical equivalents that operate in a similar manner.

Referring now to the drawings, wherein like reference numerals designate identical or corresponding parts throughout the several views, preferred embodiments of the present invention are described.

Referring to FIG. 1, a description is given of a schematic configuration of an image forming apparatus 100 according to an embodiment of the present invention.

The image forming apparatus 100 includes various image forming units and components in a main body 110 thereof. Specifically, the image forming apparatus 100 includes four process cartridges 6Y, 6M, 6C, and 6K to form visible toner images, which are yellow, magenta, cyan, and black images.

Hereinafter, the colors of respective toner images are also indicated and distinguished by describing as "Y", "M", "C", and "K".

The process cartridges 6Y, 6M, 6C, and 6K are similar in structure and functions to each other, except for using respective single colors of toners different from each other, which are yellow (Y), magenta (M), cyan (C), and black (K). Each of the process cartridges 6Y, 6M, 6C, and 6K is removably installable in the image forming apparatus 100, so that consumable image forming components included therein can be replaced at once when the consumable image forming components reach the end of their useful service life.

Now, a description is given of the process cartridge 6Y that forms yellow toner images. Since the components and functions of the process cartridge 6Y are similar to the components and functions of the process cartridges 6M, 6C, and 6K except for colors of toners, the description given below corresponds to any of the other process cartridges 6M, 6C, and 6K.

Figure 2:
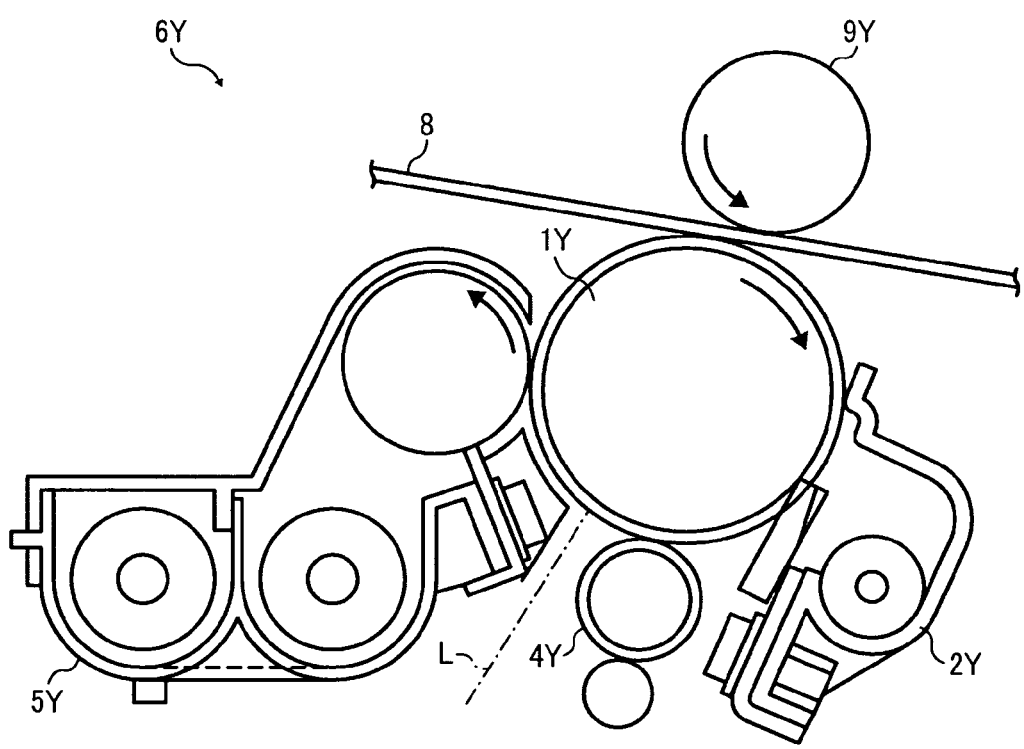
FIG. 2 is a diagram illustrating a schematic configuration of a process cartridge of the image forming apparatus of FIG. 1.

In addition to FIG. 1, the following descriptions are given in reference to FIG. 2 that illustrates a schematic configuration of the process cartridge 6Y for forming yellow toner images of the image forming apparatus 100 according to an embodiment of the present invention.

The process cartridge 6Y includes a photoconductor drum 1Y (also applicable to photoconductor drums 1M, 1C, and 1K) serving as a latent image carrier, a drum cleaning unit 2Y (corresponding to drum cleaning units 2M, 2C, and 2K), an electric discharging unit, a charging unit 4Y (corresponding to charging units 4M, 4C, and 4K), a developing unit 5Y (corresponding to developing units 5M, 5C, and 5K) and the like.

The charging unit 4Y uniformly charges a surface of the photoconductor drum 1 that is rotated by a drum driving mechanism in a clockwise direction in FIG. 2.

The image forming apparatus 100 further includes an optical writing unit 7, an intermediate transfer unit 15, a fixing unit 20, a bottle supporting mechanism 31, and a sheet feeding mechanism 115.

The optical writing unit 7 emits a laser light beam L to irradiate the charged surface of the photoconductor drum 1Y so as to form an electrostatic latent image for yellow toner image or a Y electrostatic latent image. Thereafter, the developing unit 5Y supplies yellow toner to the Y electrostatic latent image to develop the Y electrostatic latent image into a visible Y toner image. Then, the Y toner image is transferred onto a surface of an intermediate transfer belt 8. This transfer of the toner image from the photoconductor drum 1Y to the intermediate transfer belt 8 is referred to as primary transfer.

The drum cleaning unit 2Y cleans the photoconductor drum 1Y by removing residual toner remaining on the surface of the photoconductor drum 1Y from the surface thereof after the primary transfer. The electric discharging unit removes electric charges remaining on the surface of the photoconductor drum 1Y after cleaning. By performing the above-described cleaning and discharging operations, the surface of the photoconductor drum 1Y is initialized to be ready for a subsequent image forming operation.

The other process cartridges 6M, 6C, and 6K also form magenta (M), cyan (C), and black (K) toner images on respective surfaces of the photoconductor drums 1M, 1C, and 1K, respectively, to be transferred onto the surface of the intermediate transfer belt 8 for the primary transfer.

As illustrated in FIG. 1, the optical writing unit 7 is disposed below the process cartridges 6Y, 6M, 6C, and 6K.

The optical writing unit 7 that serves as a latent image forming unit emits respective laser light beams L toward the process cartridges 6Y, 6M, 6C, and 6K to irradiate the surfaces of the photoconductor drums 1Y, 1M, 1C, and 1K.

After irradiation of the laser light beams L, the Y electrostatic latent image, the M electrostatic latent image, the C electrostatic latent image, and the K electrostatic latent image are formed on the surfaces of the photoconductor drums 1Y, 1M, 1C, and 1K, respectively. The optical writing unit 7 scans the laser light beams L generated by a light source with a polygon mirror that is rotated by a motor. The scanned laser light beams L are emitted via a plurality of optical lenses and mirrors toward the photoconductor drums 1Y, 1M, 1C, and 1K.

Further, the sheet feeding mechanism 115 of the image forming apparatus 100 as illustrated in FIG. 1 is disposed below the optical writing unit 7. The sheet feeding mechanism 115 includes a sheet cassette 26, a sheet feeding roller 27, and a pair of registration rollers 28.

In the sheet cassette 26, multiple sheets including a sheet 99 that serves as a recording medium are accommodated. The sheet 99 is placed on top of the multiple sheets, being held in contact with the sheet feeding roller 27. As a driving mechanism rotates the sheet feeding roller 27 in a counterclockwise direction, the sheet 99 on top of the multiple sheets is fed toward a portion between rollers of the pair of registration rollers 28.

The pair of registration rollers 28 stops the rotations as soon as the sheet 99 is held therebetween. After the lapse of a given period of time, in synchronization with movement of the toner image formed on the intermediate transfer belt 8, the sheet 99 is conveyed toward a secondary transfer nip area, which will be described later.

In FIG. 1, the image forming apparatus 100 further includes the intermediate transfer unit 15. The intermediate transfer unit 15 is disposed above the process cartridges 6Y, 6M, 6C, and 6K and includes the intermediate transfer belt 8 that serves as an intermediate transfer member onto which toner images are transferred. The intermediate transfer unit 15 extends the intermediate transfer belt 8 to rotate endlessly.

Other than the intermediate transfer belt 8, the intermediate transfer unit 15 includes four primary transfer bias rollers 9Y, 9M, 9C, and 9K, a belt cleaning unit 10, a secondary transfer backup roller 12, a cleaning backup roller 13, and a tension roller 14.

The intermediate transfer belt 8 is wound with tension around by the seven rollers and is rotated endlessly by at least one of the seven rollers in the counterclockwise direction in FIG. 1.

The primary transfer bias rollers 9Y, 9M, 9C, and 9K are disposed facing the photoconductor drums 1Y, 1M, 1C, and 1K, respectively, with the endless intermediate transfer belt 8 interposed therebetween, which form respective primary nip areas. With this configuration, each of the primary transfer bias rollers 9Y, 9M, 9C, and 9K applies transfer bias that has a polarity opposite the bias of toner to a back side of the intermediate transfer belt 8 (i.e., an inner loop of the intermediate transfer belt 8).

The secondary transfer backup roller 12, the cleaning backup roller 13, and the tension roller 14 are electrically grounded.

As the endlessly rotating intermediate transfer belt 8 passes under the primary transfer nip areas for Y, M, C, and K toner images sequentially, these single color toner images are overlaid one after another on the surface of the intermediate transfer belt 8 for the primary transfer. With this action, a four-color (composite) toner image is formed on the surface of the intermediate transfer belt 8.

The intermediate transfer unit 15 further includes a contact and separation mechanism to contact and separate the intermediate transfer belt 8 with respect to the photoconductor drums 1Y, 1M, and 1C with the intermediate transfer belt 8 remaining contacted to the photoconductor drum 1K.

The secondary transfer backup roller 12 and a secondary transfer roller 19 disposed facing the secondary transfer backup roller 12 form a secondary transfer nip area with the intermediate transfer belt 8 interposed therebetween. The four-color toner image formed on the surface of the intermediate transfer belt 8 is transferred onto the sheet 99 at the secondary transfer nip area, and is then merged with a white area of the sheet 99 to form a full-color toner image.

After passing through the secondary transfer nip area, residual toner that has not been transferred onto the sheet 99 can remain on the surface of the intermediate transfer belt 8. As previously described, the residual toner remaining on the intermediate transfer belt 8 is removed by the belt cleaning unit 10.

At the secondary transfer nip area, the sheet 99 is held between the intermediate transfer belt 8 and the secondary transfer roller 19, both of which move in a forward direction of the surfaces thereof, and is conveyed in a direction away from the pair of registration rollers 28.

The sheet 99 that has passed through the secondary transfer nip area is further conveyed to the fixing unit 20 that is removably installable in the image forming apparatus 100. When passing the fixing unit 20, the full-color toner image formed on the sheet 99 is fixedly mounted on the sheet 99 by application of heat and pressure. The sheet 99 is then conveyed through a pair of sheet discharging rollers 29 to be discharged to the outside of the image forming apparatus 100.

The image forming apparatus 100 further includes a sheet stacker 30 on top of a housing of the main body 110 thereof. The sheet 99 and other printed sheets discharged via the pair of sheet discharging rollers 29 to the outside of the image forming apparatus 100 are sequentially stacked on the sheet stacker 30.

The bottle supporting mechanism 31 of the image forming apparatus 100 is disposed between the intermediate transfer unit 15 and the sheet stacker 30 above the intermediate transfer unit 15. The bottle supporting mechanism 31 supports the setting of toner bottles 32Y, 32M, 32C, and 32K. Each of the toner bottles 32Y, 32M, 32C, and 32K serves as a developer container to contain toner of corresponding single color.

Respective single color toners contained in the toner bottles 32Y, 32M, 32C, and 32K are supplied to the developing units 5Y, 5M, 5C, and 5K of the process cartridges 6Y, 6M, 6C, and 6K, accordingly, by a corresponding toner supplying unit. The toner bottles 32Y, 32M, 32C, and 32K are disposed separately from the process cartridges 6Y, 6M, 6C, and 6K and are removably installable in the image forming apparatus 100.

Figure 3:
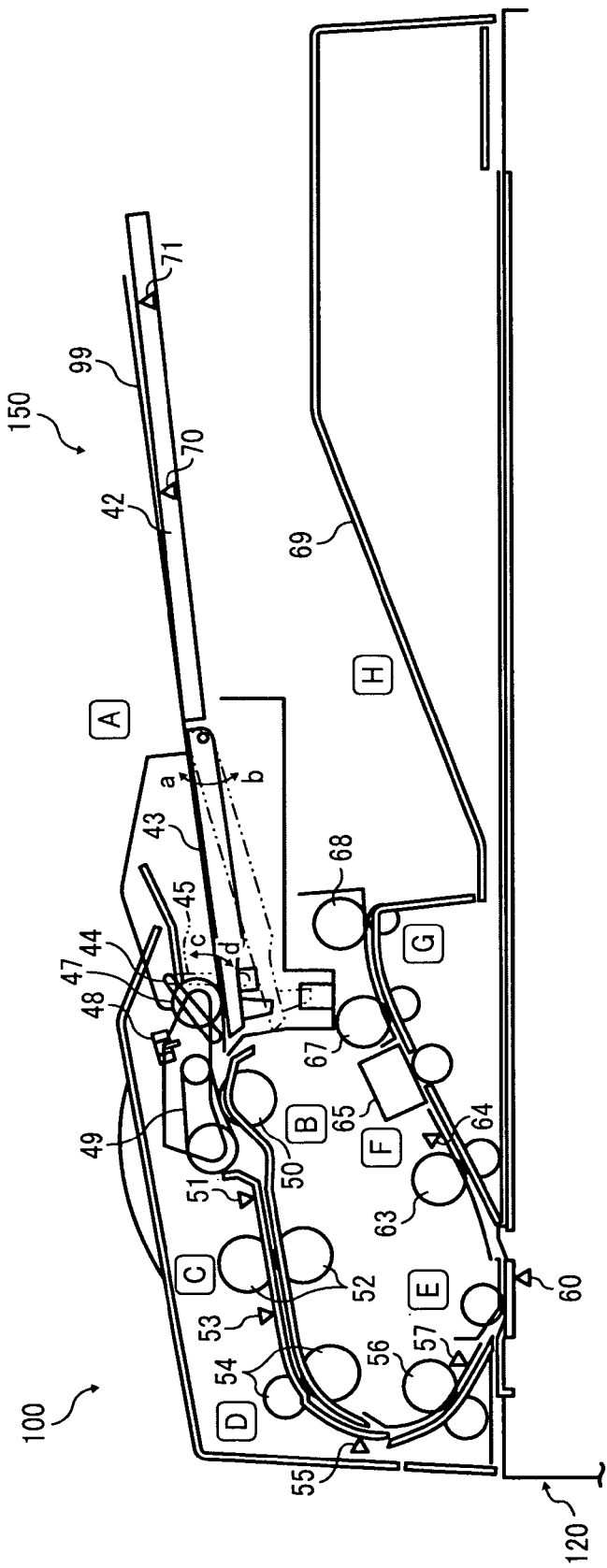
FIG. 3 is a diagram illustrating a document feeder of the image forming apparatus of FIG. 1.

FIG. 3 illustrates a configuration of a document feeder 150 that is attached to the image forming apparatus 100 according to an embodiment of the present invention. The document feeder 150 can be applied to a device to feed a document to be read (e.g., an automatic document feeder, ADF) which conveys a target document at a predetermined constant speed to a fixedly disposed reading unit so that image data on the target document can be read while the target document is being conveyed.

Next, a description is given of structure, operations, and actions of the document feeder 150.

The document feeder 150 is a part of the image forming apparatus 100 and is installed above the main body 110 of the image forming apparatus 100 such as a copier and a multifunctional (MFP) device. The document feeder 150 has various portions to process a series of document feeding operations, which are a document setting portion A, a separated document feeding portion B, a registration portion C, a turning portion D, a first reading and conveying portion E, a second reading and conveying portion F, a document discharging portion G, and a document stacking portion H.

The document setting portion A of the document feeder 150 of FIG. 3 is a plate member on which a document stack is set. A top sheet of the document stack is separated from the other sheets at the separated document feeding portion B. In the registration portion C, the separated document is jogged and aligned, and is fed again to be further conveyed in a document conveyance direction. The document is turned along a curve formed in the turning portion D to be conveyed with a surface to be read facing down. An image formed on a front side of the document is read or scanned from below at the first reading and conveying portion E and an image formed on an opposite side of the document is read at the second reading and conveying portion F. After the images on both sides of the document are read, the document is discharged to the outside of the document feeder 150 through the document discharging portion G. Then, the discharged documents are stacked in the document stacking portion H.

The document feeder 150 includes an ADF control unit to control drive units such as a pickup motor, a document feeding motor, a document reading motor, a document discharging motor, and a bottom plate lifting motor individually for performing the above-described document feeding operations and to control a series of the above-described document feeding operations.

Further, the document feeder 150 includes the following various units and components to perform the above-described document feeding operations.

A document setting table 42 includes a movable document table 43. The sheet 99 is set on the document setting table 42 with an image to be read facing up. The document setting table 42 further includes two side guides disposed at or in the vicinity of either end thereof in a width direction of the sheet 99 along a direction perpendicular to a document conveyance direction.

A document stack including the sheet 99 set on the document setting table 42 is detected by a set feeler 44 and a set sensor 45, and the detection result is transmitted to a main control unit.

The document setting table 42 further includes document length detection sensors 70 and 71. The document length detection sensors 70 and 71 are reflective sensors or actuator-type sensors that can detect the document even if only one sheet 99 is set on the document setting table 42, and are used to determine the length of the document in a document conveyance direction. In this case, the document length detection sensors 70 and 71 are located to at least determine whether a single or identical size document (e.g., A4 size) is placed in a portrait orientation or in a landscape orientation.

The movable document table 43 can be moved by the bottom plate lifting motor to rotate about a fixed support in substantially vertical directions indicated by arrows "a" and "b" as illustrated in FIG. 3. When the set feeler 44 and the set sensor 45 detect that the document stack is set on the movable document table 43, the bottom plate lifting motor rotates in a forward direction to cause the movable document table 43 to move upward so that a pickup roller 47 contacts an uppermost sheet placed on the document stack.

The pickup motor drives the pickup roller 47 to move in directions indicated by arrows "c" and "d" using a cam mechanism. At the same time, as the movable document table 43 moves up, the pickup roller 47 is pushed up by the uppermost sheet of the document stack in the direction "c". According to these actions, a table movement detection sensor 48 can detect the upper limit height (the number of sheets) of the document stack to be set on the movable document table 43.

Figure 5:
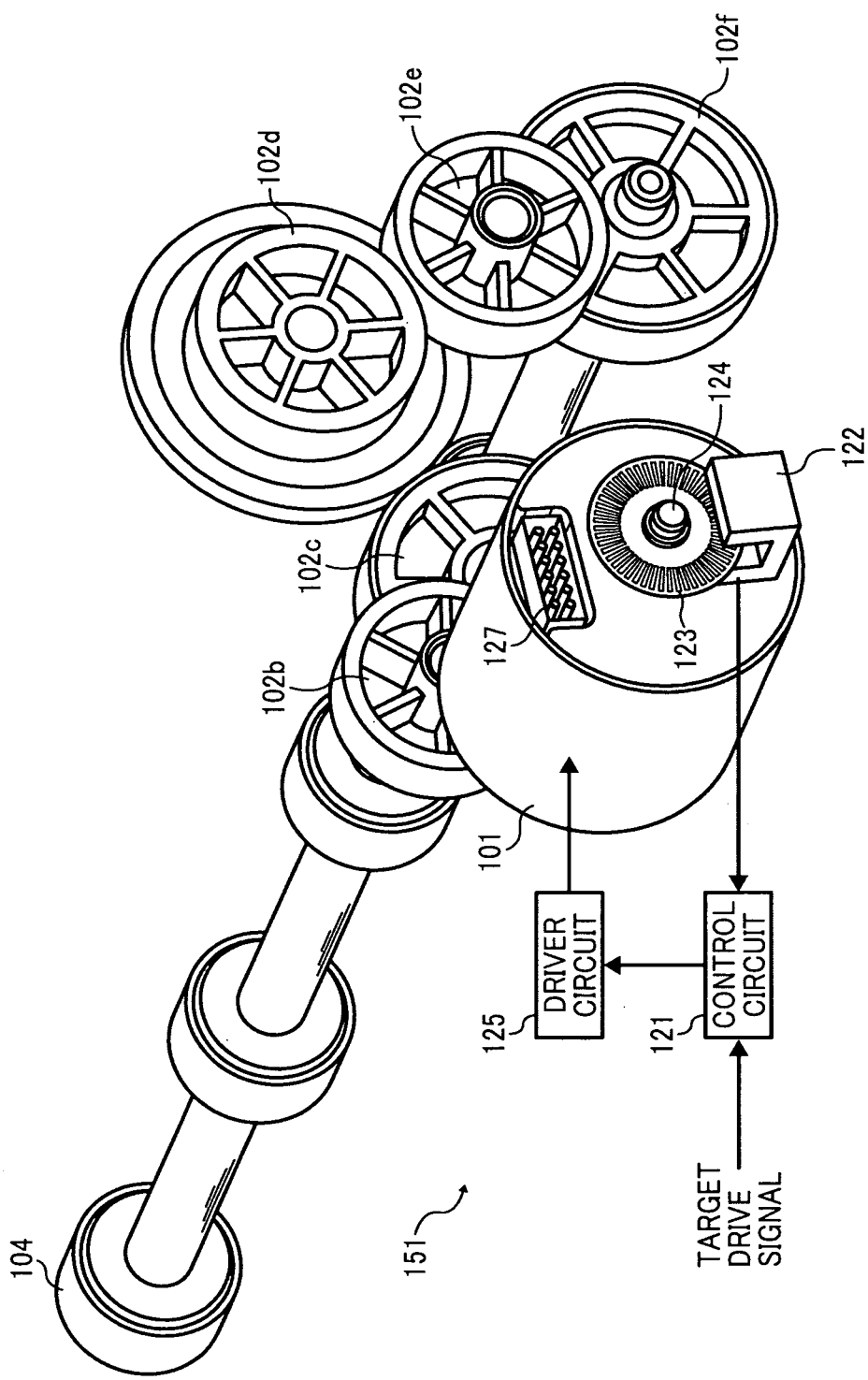
FIG. 5 is a diagram illustrating the schematic configuration of the roller drive unit of FIG. 4, viewed from a different angle.

When a PRINT key arranged on a main operation panel is pressed, the main control unit transmits a document feed signal via an interface (I/F) to the ADF control unit that includes a control circuit 121 (see FIG. 5). The document feeding motor rotates in a forward direction to rotate the pickup roller 47 to pick up several documents (preferably one document) set on the document setting table 42. The pickup roller 47 rotates in a direction of conveyance of the uppermost sheet to a document entrance portion.

The sheet feeding motor rotates in the forward direction to cause a document feeding belt 49 to move in the sheet feeding direction and to cause a reverse roller 50 to rotate in a direction opposite the document feeding direction. By so doing, the uppermost sheet and a subsequent sheet of the document stack are separated from each other to feed only the uppermost sheet from the document stack.

Specifically, the reverse roller 50 contacts the document feeding belt 49 with a predetermined pressure. When the reverse roller 50 contacts the document feeding belt 49 directly or via one sheet 99, the reverse roller 50 is rotated along with the document feeding belt 49 in the counterclockwise direction. By contrast, when the reverse roller 50 contacts the document feeding belt 49 with two or more sheets 99 interposed therebetween, a force exerted for the reverse roller 50 to be rotated is set lower than a torque output by a torque limiter. According to these operations, the reverse roller 50 can be rotated in the clockwise direction that is a correct driving direction to push back extra document(s) toward the document setting table 42, thereby preventing multi-feeding.

Due to the actions of the sheet feeding belt 49 and the reverse roller 50, the separated single document is further conveyed by the document feeding belt 49. After a document contact sensor 51 has detected the leading edge of the document, the document abuts against a pair of pull-out rollers 52 that remains stopped. Then, the document is conveyed by a given distance based on the detection results of the document contact sensor 51. By stopping the sheet feeding motor with the document being pressed against the pair of pull-out rollers 52 with a predetermined amount of deflection, the document feeding belt 49 stops moving.

In this case, by rotating the pickup motor, the pickup roller 47 can retreat from the uppermost sheet of the document stack. By conveying the document only by a conveyance force of the sheet feeding belt 49, the leading edge of the document enters a nip area formed between the pair of pull-out rollers 52 so as to align the leading edge of the document (skew correction).

The pair of pull-out rollers 52 corrects skew of the document and conveys the separated and corrected document to a pair of intermediate rollers 54. The pair of pull-out rollers 52 is rotated as the sheet feeding motor rotates in a reverse direction. When the sheet feeding motor is rotated in the reverse direction, the pair of pull-out rollers 52 and the pair of intermediate rollers 54 are driven but the pickup roller 47 and the document feeding belt 49 are not driven.

Document width sensors 53 are arranged along the width direction of the document to detect the width size of the document conveyed by the pull-out roller 52, in the width direction that is perpendicular to the document conveyance direction. Further, the length of the document in the document conveyance direction is detected based on the motor pulses by reading the leading edge and the trailing edge of the document by the document contact sensor 51.

When the document is conveyed from the registration portion C to the turning portion D as the pair of pull-out rollers 52 and the pair of intermediate rollers 54 rotate, a conveyance speed at the registration portion C is set faster than a conveyance speed at the first reading and conveying portion E to reduce a processing time to convey the document to the reading portion.

When the leading edge of the document is detected by a reading entrance sensor 55, the document conveyance speed is gradually decreased to the same speed as a reading and conveying speed before the leading edge of the document enters a nip area formed between a reading entrance roller 56 and an opposed roller disposed facing the reading entrance roller 56. At the same time, the reading motor is driven in the forward direction to rotate the reading entrance roller 56, a reading exit roller 63, and a CIS exit roller 67.

After the leading edge of the document has been detected by a registration sensor 57, the document conveyance speed is decelerated while moving a predetermined sheet conveyance distance, and the document stops temporarily before a reading position 60 under which a first reading unit is disposed in a scanner 120 of the image forming apparatus 100, and then a registration stop signal is transmitted to the main control unit via an interface.

Consequently, when a reading start signal is transmitted from the main control unit, the document that has been stopped for registration is conveyed with the speed accelerated to gain a predetermined conveyance speed before the leading edge of the document reaches the reading position 60.

When the leading edge of the document detected according to the pulse count of the reading motor reaches the reading portion, a gate signal that indicates a valid image region in a sub-scanning direction of a first side of the document is transmitted to the main control unit until the trailing edge of the document passes through the first reading unit completely.

For one-side printing, the document that has passed the first reading and conveying portion E is conveyed via a second reading portion 65 to the document discharging portion G. At this time, after a document discharging sensor 64 has detected the leading edge of the document, the sheet discharging motor is driven in the forward direction to rotate a document discharging roller 68 in the counterclockwise direction.

Further, according to the number of pulses of the sheet discharging motor counted by the document discharging sensor 64 starting from the leading edge of the document, the driving speed of the sheet discharging motor is decelerated immediately before the trailing edge of the document passes by from the nip area formed between the pair of document charging rollers 68, so that the document to be discharged to a sheet discharging tray 69 cannot be placed projected therefrom.

For duplex printing, after the document discharging sensor 64 has detected the leading edge of the document, according to the number of pulses of the reading motor counted by the document discharging sensor 64, the leading edge of the document reaches the second reading portion 65. At this time, a gate signal that indicates a valid image region in a sub-scanning direction of the document is transmitted from the ADF control unit with respect to the second reading portion 65 that includes a CCD line sensor until the trailing edge of the document passes by from the second reading portion 65.

A coating member or a member to which coating is processed is disposed on the surface of the second reading portion 65 to prevent vertical line streaks that are generated when a sticky substance adhering to the document is transferred onto the scanning line.

The reading surface of the second reading portion 65 is coated by applying a known coating material that can break down and remove dirt or a known hydrophilic coating material.

Figure 4:
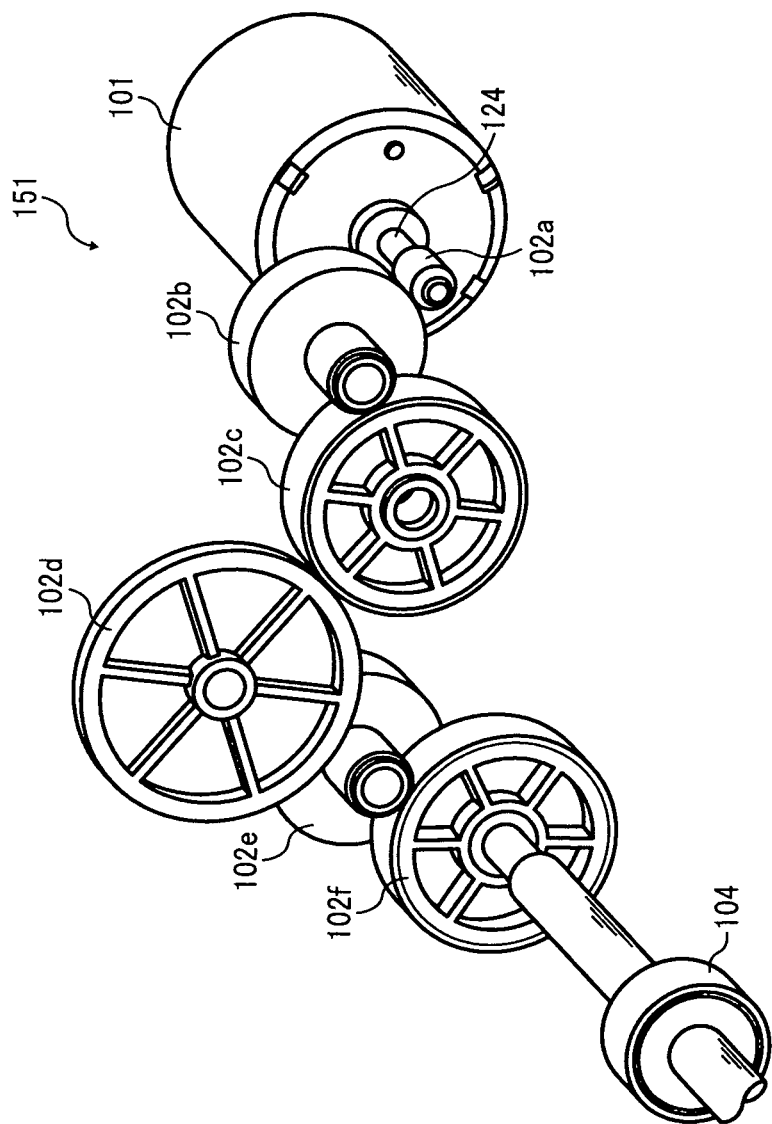
FIG. 4 is a diagram illustrating a schematic configuration of a roller drive unit of the document feeder of FIG. 3.

FIGS. 4 and 5 illustrate a schematic configuration of a roller drive unit 151 of the document feeder 150 of the image forming apparatus 100 according to an embodiment of the present invention.

As illustrated in FIGS. 4 and 5, the drive unit 151 includes the motors to drive any drive rollers provided in the document feeder 150 illustrated in FIG. 3 and the control units to control the motors.

More specifically, the drive unit 151 includes a motor 101 that serves as a drive source and is constituted as an inner rotor brushless DC motor. The motor 101 rotates a roller 104 via a gear 102a that is fixedly mounted on an output shaft 124 and reduction gears 102b, 102c, 102d, 102e, and 102f.

The roller 104 corresponds to any of the reading entrance roller 56, the reading exit roller 63, and the CIS exit roller 67 of the document feeder 150 illustrated in FIG. 3. The roller 104 may also be, for example, the sheet feeding roller 27 provided in the main body 110 of the image forming apparatus 100 illustrated in FIG. 1.

A connector 127 is mounted on a substrate that is attached to the motor 101. Motor signals and encoder signals are inputted and outputted through the connector 127.

The encoder disk 123 includes a predetermined number of slits at predetermined angular intervals in a circumferential direction. The encoder disk 123 is fixedly mounted on the output shaft 124 of the motor 101 vertically and coaxially to rotate with rotation of the output shaft 124.

A photosensor 122 that serves as an optical sensor is attached to the motor 101. The photosensor 122 illustrated in FIG. 5 is U-shaped to interpose the encoder disk 123 therebetween, with spaces between both edges thereof arranged facing each other. Slits provided in the encoder disk 123 allow light to pass therethrough; otherwise, the light is blocked so that pulse signals are formed at the light receiving element of the photosensor 122 and subsequently transmitted to a control circuit 121.

The control circuit 121 counts the number of pulse signals transmitted from the photosensor 122 so that an amount of rotation and a speed of rotation of the motor 101 are derived and information on the position and speed of the sheet 99 can be obtained based on the information on the position and speed of the roller 104.

In this embodiment, the photosensor 122 includes two pairs of light emitting elements and light receiving elements, and is arranged such that a phase difference between pulse signals from each of the two pairs of light emitting elements and light receiving elements falls within a predetermined range (e.g., $\pi/2$ [rad] in this embodiment).

Figure 8:
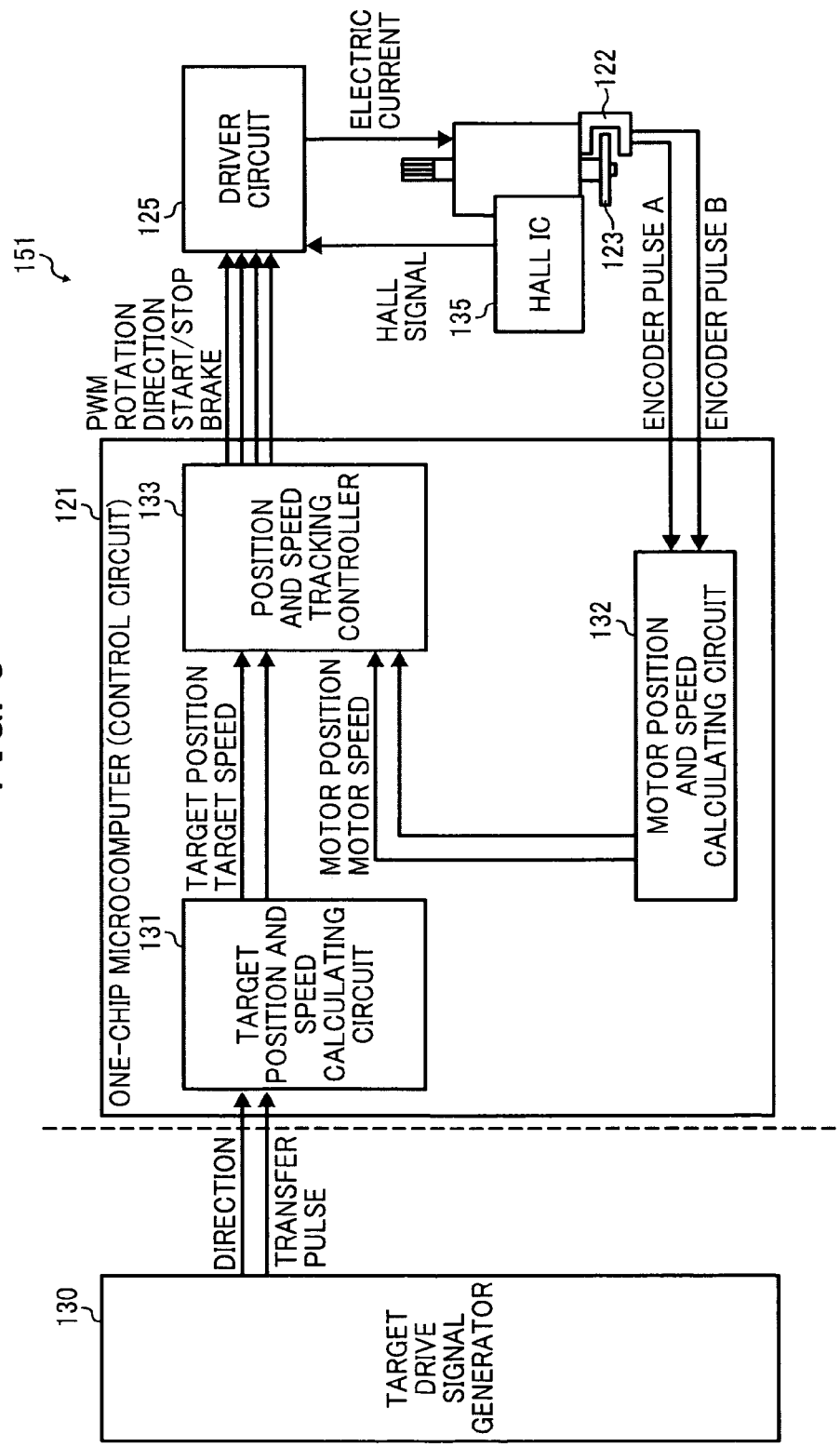
FIG. 8 is a block diagram illustrating a configuration of the drive unit that can be applied to the image forming apparatus of FIG. 1.

The control circuit 121 generates an actuating signal for the motor 101 based on signals output from a target drive signal generator (i.e., a target drive signal generator 130 as illustrated in FIG. 8) and the photosensor 122 and transmits the actuating signal to the driver circuit 125. Then, the driver circuit 125 applies an electric current matching the actuating signal generated by the control circuit 121 to the motor 101 so as to rotate the roller 104.

Figure 6:
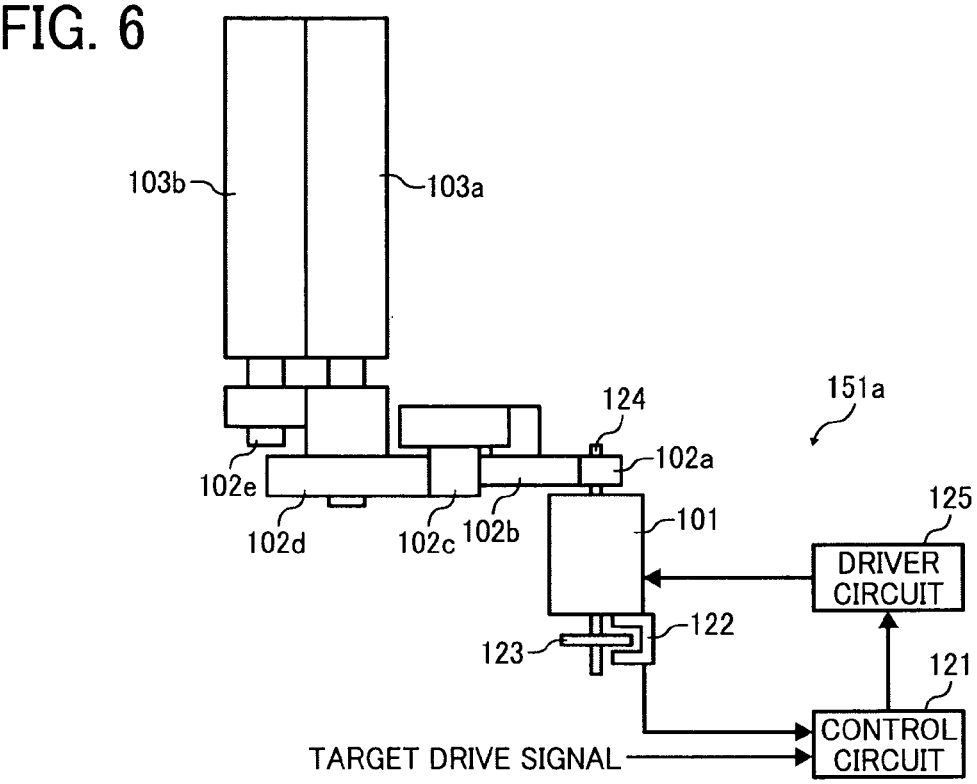
FIG. 6 is a diagram illustrating a schematic configuration of a drive unit of the document feeder of FIG. 3.

FIG. 6 illustrates a schematic configuration of a roller drive unit 151a of the document feeder 150 of the image forming apparatus 100 according to an embodiment of the present invention.

As illustrated in FIG. 6, the drive unit 151a includes the motors to drive any drive rollers provided in the document feeder 150 illustrated in FIG. 3 and the control units to control the motors.

The elements or components of the drive unit 151a illustrated in FIG. 6 are similar in structure and functions to the elements or components of the drive unit 151 illustrated in FIGS. 4 and 5. Except, the drive unit 151a of FIG. 6 further includes a pair of rollers 103a and 103b between which the document or the sheet 99 as illustrated in FIG. 3 is held and conveyed. For example, the pair of rollers 103a and 103b corresponds to any of the reading entrance roller 56, the reading exit roller 63, and the CIS exit roller 67 of the document feeder 150 illustrated in FIG. 3. The pair of rollers 103a and 103b can be, for example, the sheet feeding roller 27 provided in the main body 110 of the image forming, apparatus 100 illustrated in FIG. 1.

The drive unit 151a includes the motor 101 that serves as a drive source and is constituted as an inner rotor brushless DC motor. The motor 101 rotates the pair of rollers 103a and 103b via the gear 102a that is fixedly mounted on the output shaft 124 and the reduction gears 102b, 102c, 102d, and 102e.

Further, the encoder disk 123 includes a predetermined number of slits at predetermined angular intervals in a circumferential direction. The encoder disk 123 is fixedly mounted on the output shaft 124 of the motor 101 vertically and coaxially to rotate with rotation of the output shaft 124.

The photosensor 122 that serves as an optical sensor is attached to the motor 101. The photosensor 122 illustrated in FIG. 6 is U-shaped to interpose the encoder disk 123 therebetween, with spaces between both edges arranged facing each other. Slits provided in the encoder disk 123 allow light to pass therethrough; otherwise, the light is blocked so that pulse signals are formed at the light receiving element of the photosensor 122 and subsequently transmitted to the control circuit 121.

The control circuit 121 counts the number of pulse signals transmitted from the photosensor 122 so that an amount of rotation and a speed of rotation of the motor 101 are derived and information on the position and speed of the sheet 99 can be obtained based on the information on the position and speed of the pair of rollers 103a and 103b.

In this embodiment, the photosensor 122 includes the two pairs of light emitting elements and light receiving elements, and is arranged such that a phase difference between pulse signals from each of the two pairs of light emitting elements and light receiving elements falls within a predetermined range (e.g., $\pi/2$ [rad] in this embodiment).

The control circuit 121 generates an actuating signal for the motor 101 based on signals output from a target drive signal generator (i.e., the target drive signal generator 130 as illustrated in FIG. 8) and the photosensor 122 and transmits the actuating signal to the driver circuit 125. Then, the driver circuit 125 applies an electric current matching the actuating signal generated by the control circuit 121 to the motor 101 so as to rotate the pair of rollers 103a and 103b.

Figure 7:
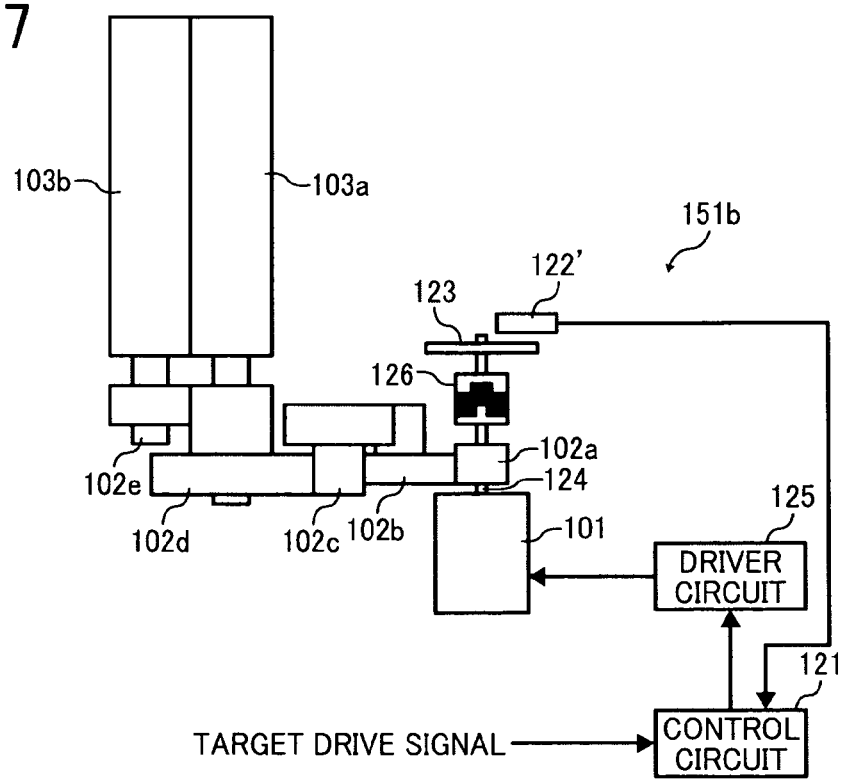
FIG. 7 is a diagram illustrating a schematic configuration of another drive unit of the document feeder of FIG. 3.

FIG. 7 illustrates a schematic configuration of a roller drive unit 151b of the document feeder 150 of the image forming apparatus 100 according to yet another embodiment of the present invention.

As illustrated in FIG. 7, the drive unit 151b includes the motors to drive any drive roller provided in the document feeder 150 illustrated in FIG. 3 and the control units to control the motors.

The elements or components of the drive unit 151b illustrated in FIG. 7 are similar in structure and functions to the elements or components of the drive unit 151 illustrated in FIGS. 4 and 5. Except, the drive unit 151b of FIG. 7 further includes the pair of rollers 103a and 103b between which the document or the sheet 99 as illustrated in FIG. 3 is held and conveyed. For example, the pair of rollers 103a and 103b corresponds to any of the reading entrance roller 56, the reading exit roller 63, and the CIS exit roller 67 of the document feeder 150 illustrated in FIG. 3. The pair of rollers 103a and 103b can be, for example, the sheet feeding roller 27 provided in the main body 110 of the image forming apparatus 100 illustrated in FIG. 1.

The drive unit 151b includes the motor 101 that serves as a drive source and is constituted as an inner rotor brushless DC motor. The motor 101 rotates the pair of rollers 103a and 103b via the gear 102a that is fixedly mounted on the output shaft 124 and the reduction gears 102b, 102c, 102d, and 102e.

Further, the encoder disk 123 includes a predetermined number of slits at predetermined angular intervals in a circumferential direction. The encoder disk 123 is fixedly mounted on the output shaft 124 of the motor 101 via the output shaft 124 and a coupling 126 vertically and coaxially to rotate with rotation of the output shaft 124.

A photosensor 122' that serves as a reflective-type optical sensor is attached to a fixed member of the drive unit 151b, which is not illustrated in FIG. 7. The photosensor 122' illustrated in FIG. 7 is disposed facing and parallel to the encoder disk 123. Light paths are allowed to pass through slits provided on the encoder disk 123 and are blocked and reflected by the portions other than the slits of the encoder disk 123 where no slits are formed. The light receiving element of the photosensor 122' detects the reflected lights. Then, pulse signals are generated based on the detection results obtained by the light receiving element and subsequently transmitted to the control circuit 121.

The control circuit 121 counts the number of pulse signals transmitted from the photosensor 122' so that an amount of rotation and a speed of rotation of the motor 101 are derived and information on the position and speed of the sheet 99 can be obtained based on the information on the position and speed of the pair of rollers 103a and 103b.

In this embodiment, the photosensor 122' includes two pairs of light emitting elements and light receiving elements, and is arranged such that a phase difference between pulse signals from each of the two pairs of light emitting elements and light receiving elements falls within a predetermined range (e.g., $\pi/2$ [rad] in this embodiment).

The control circuit 121 generates an actuating signal for the motor 101 based on signals output from a target drive signal generator (i.e., the target drive signal generator 130 as illustrated in FIG. 8) and the photosensor 122' and transmits the actuating signal to the driver circuit 125. Then, the driver circuit 125 applies an electric current matching the actuating signal generated by the control circuit 121 to the motor 101 so as to rotate the pair of rollers 103a and 103b.

FIG. 8 illustrates a schematic diagram of the configuration of the drive unit 151 of the document feeder 150 of the image forming apparatus 100 according to an embodiment of the present invention. The configuration of the drive unit 151 illustrated in FIG. 8 is similar to the configurations of the drive units 151a and 151b.

As illustrated in FIG. 8, the drive unit (e.g., the drive units 151, 151a, and 151b) includes the motors to drive any drive roller provided in the image forming apparatus 100 illustrated in FIG. 1 or the document feeder 150 illustrated in FIG. 3 and the control units to control the motors.

In the drive unit 151 of FIG. 8, a signal indicating a direction of rotation of the roller 104 and a signal indicating the number of transfer pulses are transmitted from a target drive signal generator 130 that is disposed externally to a target position and speed calculating circuit 131 disposed in the control circuit 121. Specifically, the target position and speed calculating circuit 131 provided in the control circuit 121 obtains the signal indicating a direction of rotation of the roller 104 and the signal indicating the number of transfer pulses, both of which serve as target drive signals, from the target drive signal generator 130 that is an external device.

In the target position and speed calculating circuit 131, a target position and a target speed are obtained based on the obtained information and the time information obtained by an oscillator so as to transmit the signals to a position and speed tracking controller 133.

Further, in a motor position and speed calculating circuit 132 located in the control circuit 121, the photosensor 122 configured as a two-channel photosensor counts the number of pulses of the encoder disk 123. The photosensor 122 and the encoder disk 123 form a two-channel rotary encoder.

In this embodiment, the number of pulses of the encoder disk 123 per cycle is set to 100 pulses. In order to detect the rotation of the output shaft 124 of the motor 101 at low cost, the number of pulses of the encoder disk 123 per cycle is preferably set to 200 pulses or less.

Further, in order to facilitate replacement of a stepping motor with an inner rotor brushless DC motor, the number of pulses of the encoder disk 123 per cycle is preferably set to 12×N pulses or 50×N pulses (where "N" is a natural number).

Here, the photosensor 122 configured as a two-channel photosensor includes two pairs of light emitting elements and light receiving elements and is arranged such that a phase difference between pulse signals of each of the two pairs of light emitting elements and light receiving elements falls in a predetermined range (e.g., $\pi/2$ [rad] in this embodiment). Consequently, the motor position and speed calculating circuit 132 utilizes the phase difference to obtain the rotation direction of the roller 104.

In the motor position and speed calculating circuit 132, motor position and motor speed are obtained based on the obtained information and the time information obtained by the oscillator, so as to transmit the signals to the position and speed tracking controller 133.

The position and speed tracking controller 133 matches the target position and the motor position and matches the target speed and the motor speed, and transmits signals indicating pulse width modulation (PWM) output, direction of rotation, start and stop, and braking to the driver circuit 125 as necessary.

The driver circuit 125 is a four-quadrant driver to control a motor electric current and a PWM voltage based on a signal obtained from the position and speed tracking controller 133 and a Hall signal obtained from a Hall IC 135.

Specifically, in the drive unit 151, the control circuit 121 obtains a target number of revolutions per unit time $\Delta Xt$ and a target amount of total rotations Xt based on the target drive signal and a number of motor revolutions per unit time $\Delta Xm$ and a total number of motor revolutions Xm based on the signals output from the photosensor 122 and the encoder disk 123. Then, the signal output to the driver circuit 125 is adjusted such that the target total number of revolutions Xt and the total number of motor revolutions Xm become equal and such that the target number of revolutions per unit time $\Delta Xt$ and the number of motor revolutions per unit time $\Delta Xm$ become equal. By so doing, the control circuit 121 can control the rotation speed of the motor 101.

In this embodiment, the driver circuit 125 is not mounted on the motor 101 but is not limited the configuration. For example, a configuration in which the driver circuit 125 is mounted on a substrate disposed on the motor 101 can reduce the number of harnesses, thereby contributing to a reduction in cost.

In this embodiment, the target drive signal generator 130 is not included in the drive unit 151 but is included in the main control unit of the image forming apparatus 100 or the ADF control unit of the document feeder 150. However, the target drive signal generator 130 can be included in the drive unit 151.

Figure 9B:
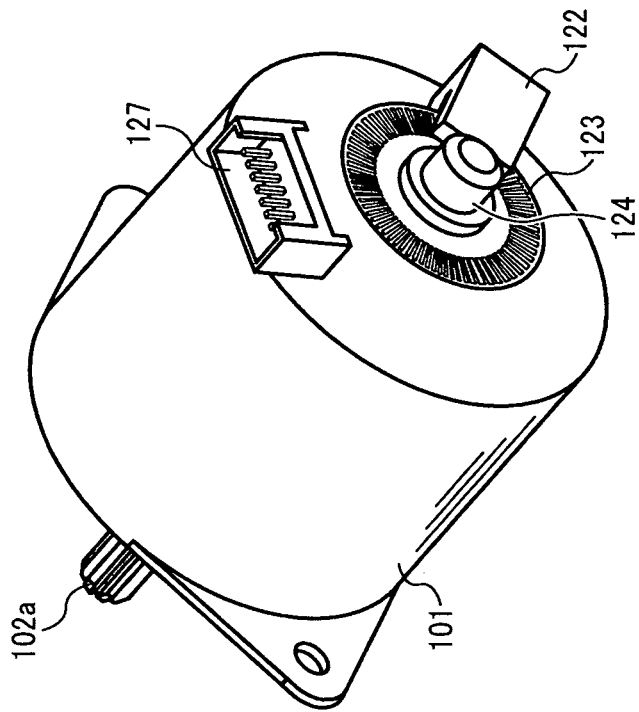
FIG. 9B is a perspective view of the motor of the drive unit of FIG. 9A, viewed from a different angle.
Figure 9A:
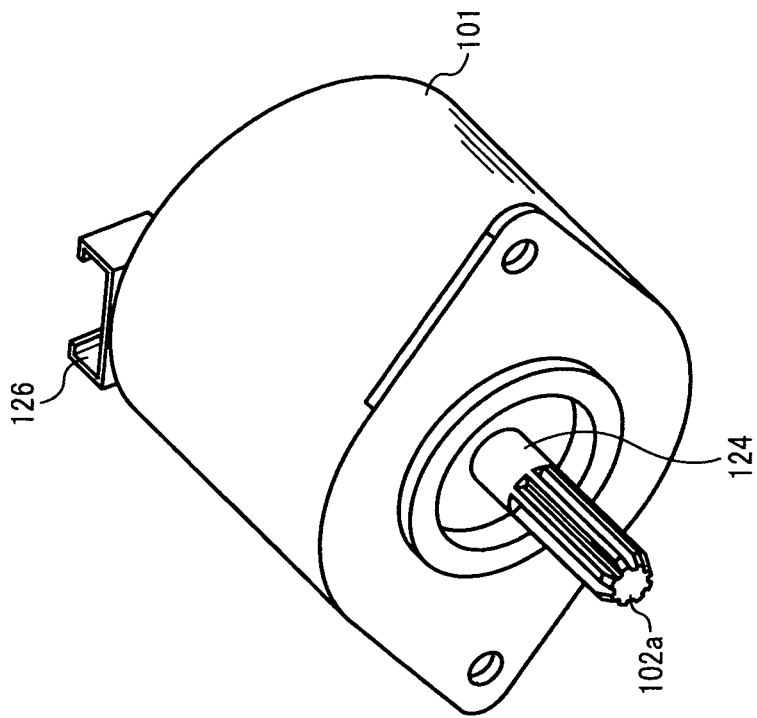
FIG. 9A is a perspective view illustrating a configuration of a motor of the drive unit according to an embodiment of the present invention.

FIGS. 9A and 9B are perspective view illustrating a configuration of the motor 101 of the drive unit 151 (151a and 151b) of the image forming apparatus 100 according to an embodiment of the present invention. The motor 101 of FIG. 9B is viewed from a different angle from FIG. 9A.

As illustrated in FIGS. 9A and 9B, the gear 102a that serves as a drive transmitter is created by a gear cutting process directly at one end on the output shaft 124 of the motor 101. This configuration can increase the reduction gear ratio of the first step of the motor 101 and achieve a reduction in cost.

Further, the encoder disk 123 is fixedly disposed at the other end of the output shaft 124 of the motor 101, coaxially with the gear 102a. The photosensor 122 is attached to the motor 101 and the driver circuit 125 (see FIG. 8) is attached to a substrate mounted on the motor 101. The connector 127 is attached to the substrate on the motor 101 to input and output motor signals and encoder signals.

Further, the motor 101 uses a ball bearing as a bearing for supporting the motor 101. With this configuration, a friction force of the bearing with respect to the motor 101 is reduced when compared to a configuration employing a sintered bearing. Therefore, high efficiency due to use of the DC-type motor 101 can be further enhanced, thereby increasing the durability of the motor 101.

Figure 10A:
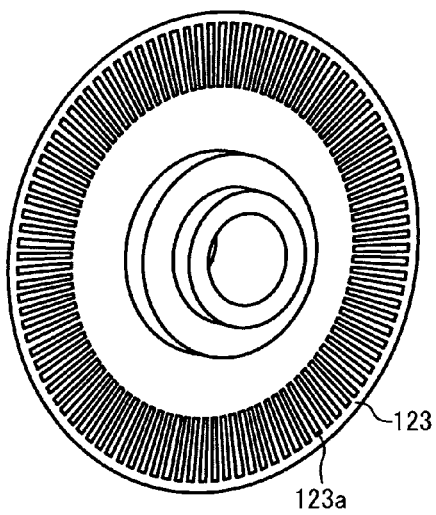
FIG. 10A is a perspective view illustrating a configuration of an encoder disk of the drive unit according to an embodiment of the present invention.
Figure 10B:
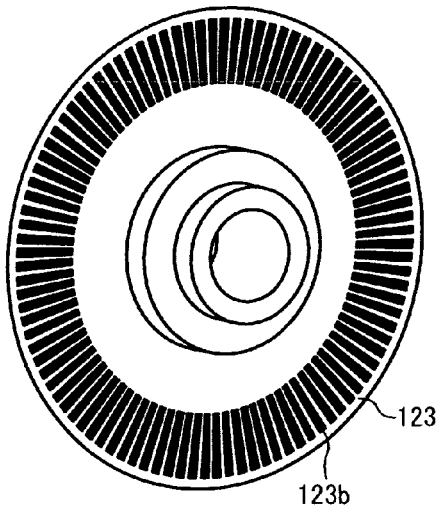
FIG. 10B is a perspective view of a configuration of another encoder disk of the drive unit according to an embodiment of the present invention.

FIGS. 10A and 10B are perspective views illustrating a configuration of the encoder disk 123 of the image forming apparatus 100 according to an embodiment of the present invention.

The encoder disk 123 illustrated in FIG. 10A is a slit disk having equally-spaced slit-shaped hole scales 123a etched in a circumferential direction (e.g., a direction of rotation thereof) on a metal plate formed by metallic material. The encoder disk 123 having slit-shaped hole scales 123a thereon allows the light receiving element of the photosensor 122 to detect whether or not any signal is received for pulse detection.

The encoder disk 123 illustrated in FIG. 10B is a photo etched disk having equally-spaced fine slit-shaped line scales 123b formed on a film with black ink. The encoder disk 123 having fine slit-shaped lines 123b thereon allows the light receiving element of the photosensor 122 to detect signals or difference of light amount for pulse detection. The encoder disk 123 illustrated in FIG. 10B uses black ink for forming the slit-shaped line scales 123b but any material other than black ink can be used if it can detect any light paths and the difference of light amount.

In this embodiment, the document feeder 150 is included in the image forming apparatus 100 as a part thereof and the drive unit 151 is a unit to drive any drive roller of the image forming apparatus 100 or any drive roller of the document feeder 150 included in the image forming apparatus 100 as a part thereof. However, in a case in which the document feeder 150 serves a peripheral unit of the image forming apparatus 100, the drive unit 151 drives any drive roller of the image forming apparatus 100 and any drive roller of the document feeder 150 as a peripheral of the image forming apparatus 100.

Figure 11A:
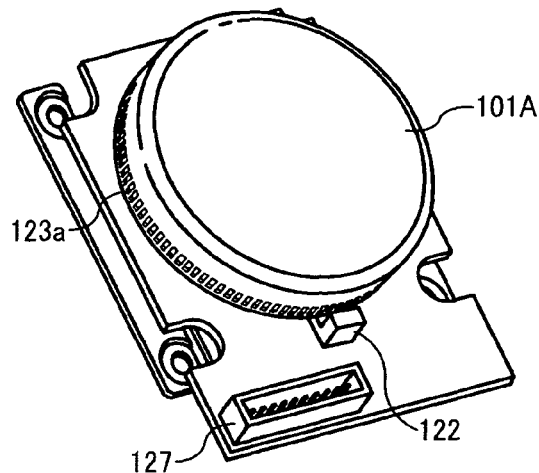
FIG. 11A is a perspective view of a different configuration of the motor of the drive unit according to an embodiment of the present invention.
Figure 11B:
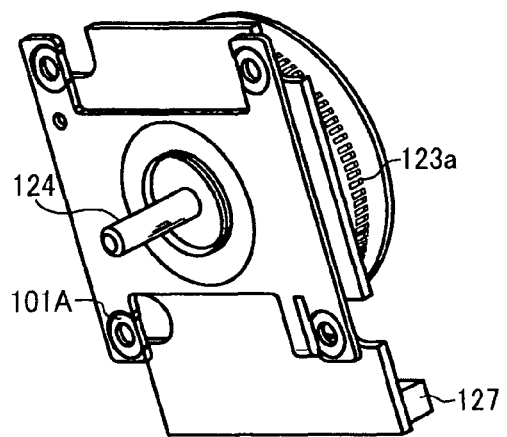
FIG. 11B is a perspective view of another configuration of the motor of the drive unit according to an embodiment of the present invention, different from the configuration of the motor of the drive unit of FIG. 11A.
Figure 12:
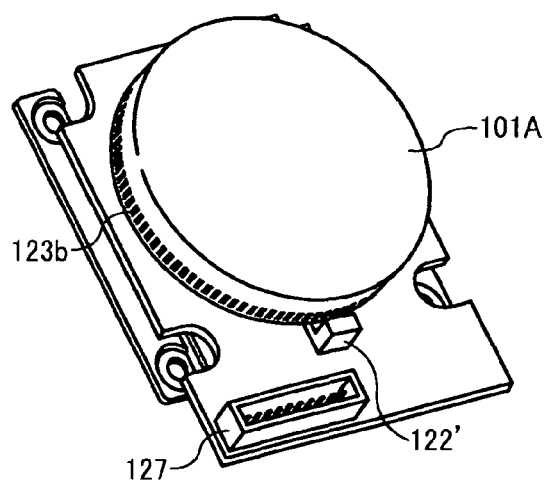
FIG. 12 is a perspective view of a yet another configuration of the motor of the drive unit according to an embodiment of the present invention.

FIGS. 11A, 11B, and 12 illustrate configurations of an outer rotor brushless motor 101A with an encoder, as modified examples.

FIGS. 11A and 11B illustrate a configuration according to a modified example of the above-described embodiment, in which the drive unit 151 has an outer rotor brushless motor 101A with an encoder from different views. FIG. 11A illustrates a front side of the outer rotor brushless motor 101A and FIG. 11B illustrates a rear side thereof. As illustrated in FIGS. 11A and 11B, the outer rotor brushless motor 101A can include the photosensor 122 that serves as a through beam sensor to detect the slit-shaped hole scales 123a that are formed integrally on an outer rotor of the outer rotor brushless motor 101A.

FIG. 12 illustrates a configuration according to another modified example of the above-described embodiment, in which the drive unit 151 has the outer rotor brushless motor 101A with an encoder different from the encoder of the outer rotor brushless motor 101A of FIGS. 11A and 11B. As illustrated in FIG. 12, the outer rotor brushless motor 101A can include the photosensor 122' that serves as a reflective sensor to detect the fine slit-shaped line scales 123b that are formed integrally on an outer rotor of the outer rotor brushless motor 101A.

Other than the modified examples in which the slit-shaped hole scales 123a or the slit-shaped line scales 123b are directly formed on the outer rotor of the outer rotor brushless motor 101A as illustrated in FIGS. 11A, 11B, and 12, the encoder disk 123 illustrated in FIGS. 10A and 10B can be attached to the outer rotor brushless motor 101A to read the encoder disk 123 by the photosensor 122 or the photosensor 122'.

In this embodiment, the amount of rotations and direction of rotations of the motor 101 serving as an inner rotor brushless DC motor as illustrated in FIGS. 4 through 9 or the motor 101A serving as an outer rotor brushless motor as illustrated in FIGS. 11A, 11B, and 12 are obtained so that the control circuit 121 controls at least one of the rotation amount and rotation position of the motors 101 and 101A.

As described above, each of the drive units 151, 151a, and 151b (hereinafter, collectively referred to as "the drive unit 151") according to an embodiment of the present invention includes the motor 101 serving as an inner rotor brushless DC motor that is a drive source having the output shaft 124, the photosensor 122 or 122' (hereinafter, collectively referred to as "the photosensor 122") and the encoder disk 123 to detect an amount of rotations and a direction of rotation of the output shaft 124 of the motor 101, the control circuit 121 to control rotations of the motor 101, and the driver circuit 125 to supply power to drive the motor 101 based on the signal output to the driver circuit 125 from the control circuit 121. In the drive unit 151, the control circuit 121 obtains the target drive signal of the motor 101 externally and the detection signal from the photosensor 122 and the encoder disk 123 and outputs a signal. The control circuit 121 controls at least one of the speed of rotations and the position of rotations of the motor 101 by varying the (actuating) signal output to the driver circuit 125 based on the target drive signal and the detection signal.

With this configuration in which the inner rotor brushless DC motor is employed as the motor 101, when compared to a stepping motor, energy efficiency can be enhanced and the weight of the motor can be reduced. Further, since the inertia of the motor 101 may be less than an outer rotor brushless motor, the speed of the motor 101 can be accelerated or decelerated as a stepping motor. Furthermore, since the motor 101 does not include a brush member, it may not be affected by brush wear and is highly durable, compared to a motor using a brush member.

If the rotation detector such as the photosensor 122 and the encoder disk 123 is configured to detect not the rotation of the output shaft 124 of the motor 101 but the rotation of a driven target such as the roller 104, a controller should be designed, considering the amount of movement of the driven target per cycle of a motor, and/or the design of the controller should be modified when the configuration of a transmission system and a drive target is changed or the same drive unit is applied to a different position. However, by using the photosensor 122 and the encoder disk 123 to detect the number of rotations and the direction of rotation of the output shaft 124 of the motor 101, this configuration can avoid the above-described control design or design change and achieve a simpler configuration.

Accordingly, this configuration can achieve high efficiency, good responsiveness as a stepping motor at acceleration and deceleration, and high durability of the motor 101.

Further, in the drive unit 151 according to an embodiment of the present invention, the control circuit 121 obtains a target number of revolutions per unit time ΔXt and a target total number of revolutions Xt based on the target drive signal and a number of motor revolutions per unit time ΔXm and a total number of motor revolutions Xm based on the detection signal output from the photosensor 122 and the encoder disk 123. Then, the control circuit 121 controls the speed of rotation of the motor 101 by varying the signal output to the driver circuit 125 to cause the target total number of revolutions Xt obtained based on the target drive signal to be equal to the total number of motor revolutions Xm based on the detection signal output from the photosensor 122 and the encoder disk 123 and to cause the target number of revolutions per unit time ΔXt obtained based on the target drive signal to be equal to the number of motor revolutions per unit time ΔXm obtained based on the detection signal output from the photosensor 122 and the encoder disk 123.

With this configuration, the control circuit 121 obtains position and speed information based on the target drive signal and the detection signal output from the photosensor 122 and the encoder disk 123, and can perform accurate position control, speed control, and hold control by varying the signal to the driver circuit 125 according to the difference.

Further, the drive unit 151 according to an embodiment of the present invention includes a four-quadrant driver as the driver circuit 125.

If a drive unit does not use a four-quadrant drive circuit as a drive circuit, the drive circuit cannot supply regenerative current and cannot control to stop spontaneously due to mechanical load and the like. By contrast, with this configuration in which the drive unit 125 includes a four-quadrant driver, the driver circuit 125 can supply regenerative current to stop the motor 101, that is, the driver circuit 125 can stop the motor 101 while controlling. Therefore, the motor 101 can be used as a stepping motor.

Further, the drive unit 151 according to an embodiment of the present invention uses a two-channel rotary encoder having the encoder disk 123 as the rotation detector and the number of pulses per cycle of the encoder disk 123 is no more than 200 pulses per cycle.

With this configuration having a two-channel rotary encoder, the direction of rotation can be determined. Further, by providing the encoder disk 123 having no more than 200 pulses per cycle, the rotation of the output shaft 124 of the motor 101 can be detected at low cost.

Further, in the drive unit 151 according to an embodiment of the present invention, the number of pulses per cycle of the encoder disk 123 is one of 12×N pulses and 50×N pulses, where N is a natural number.

Generally, a PM motor has 48 pulses per cycle at 2-phase energization and an HB motor has 200 pulses per cycle at 2-phase energization. In this configuration, by using a value obtained by the encoder 123 in the mode of a single/double/quad edge evaluation, the number of detected pulses per rotation of the motor 101 is matched with the number of pulses per rotation of the stepping motor. Then, when the stepping motor is replaced to the motor 101 serving as an inner rotor brushless DC motor, the number of detected pulses per rotation of the motor 101 can be used for the target drive signal to the control circuit 121 without varying the signal output from the target drive signal generator 130.

Further, the drive unit 151 according to an embodiment of the present invention includes the gear 102a that serves as a drive transmission unit attached to the output shaft 124 of the motor 101. The encoder disk 123 is disposed at a side opposite a side to which the gear 102a attached and the encoder disk 123 is fixedly mounted on the output shaft 124 of the motor 101.

With this configuration, by disposing the encoder disk 123 at the side opposite the side to which the gear 102a attached and the encoder disk 123 is fixedly mounted on the output shaft 124 of the motor 101, the encoder disk 123 and the output shaft 124 of the motor 101 are integrally mounted. Accordingly, the harness pathway can be made simpler, the footprint can be smaller, and the eccentric component per rotation due to improvement of mounting accuracy of the encoder disk 123 can be reduced.

Further, in the drive unit 151 according to an embodiment of the present invention, the encoder disk 123 is made of a metallic material.

With this configuration, compared with plastic material or film material, the encoder disk 123 made of a metallic material can minimize an effect of heat applied by a heat source of the motor 101.

Further, in the drive unit 151 according to an embodiment of the present invention, the encoder disk 123 has slit-shaped scales formed thereon and the photosensor 122 detects an amount of movement thereof by detecting the slit-shaped scales.

With this configuration, compared with a configuration in which no slit-shaped scales are provided and detection depends on reflectance differences and a configuration in which detection depends on transmittance differences, occurrence of misdetection due to foreign materials or dust attached to the encoder disk 123 can be reduced.

Further, in the drive unit 151 according to an embodiment of the present invention, the output shaft 124 of the motor 101 is supported by ball bearings.

Since this configuration in which the ball bearings are used to support the output shaft 124 of the motor 101 can reduce the amount of friction force compared to a configuration using sintered bearings, this configuration can achieve higher efficiency with the motor 101 serving as an inner rotor brushless DC motor and higher durability of the motor 101.

Further, in the drive unit 151 according to an embodiment of the present invention, the motor 101 uses a Hall integrated circuit 135.

Generally the Hall signal is output by a low-voltage analog signal and therefore the Hall element is affected by noise. When the driver circuit 125 is located in the vicinity of the motor 101, the Hall element is not affected by noise easily. By contrast, the driver circuit 125 is located away from the motor 101, the driver circuit 125 may pick up the noise in the middle of the pathway between the driver circuit 125 and the motor 101 and therefore misdetection can occur at a higher possibility. However, with this configuration using the Hall IC 135, the Hall signal is output as a digital signal formed by high-level waves and low-level waves and therefore can be robust against noise.

Further, in the drive unit 151 according to an embodiment of the present invention, the output shaft 124 of the motor 101 includes gear teeth directly.

With this configuration, the motor 101 that serves as an inner rotor brushless DC motor can provide higher efficiency in a high speed area, compared with a stepping motor. Therefore, the motor 101 can be used in the high speed area more frequently than the stepping motor. Compared to when gears are disposed with press-fitting with respect to the output shaft 124, when the number of teeth formed along the circumferential surface of a gear is reduced, the speed reduction ratio of the gear with respect to the target object can be increased. Further, compared to when another gear different from the gear for the output shaft 124 of the motor 101, the configuration can achieve the cost reduction and weight reduction of this configuration.

Further, the image forming apparatus 100 according to an embodiment of the present invention includes the above-described drive unit 151.

With this configuration, the image forming apparatus 100 including the drive unit 151 can achieve high efficiency, good responsiveness as a stepping motor at acceleration and deceleration, and high durability of the motor 101.

Further, the document feeder 150 according to an embodiment of the present invention includes the above-described drive unit 151.

With this configuration, the document feeder 150 including the drive unit 151 can achieve high efficiency, good responsiveness as a stepping motor at acceleration and deceleration, and high durability of the motor 101.

As described above, the drive unit and the image forming apparatus including the drive unit according to an embodiment of the present invention can achieve high efficiency, good responsiveness as a stepping motor at acceleration and deceleration, and high durability of the motor and can be applied as a drive unit, an image forming apparatus such as a copier, facsimile machine, printer and so forth, incorporating the drive unit, a peripheral device incorporating the drive unit for the image forming apparatus, and a control method for the drive unit.

The above-described embodiments are illustrative and do not limit the present invention. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

What is claimed is:

1. A drive unit, comprising:
    an inner rotor brushless DC motor having an output shaft;
    a driver to supply power to drive the inner rotor brushless DC motor;
    a rotation detector to detect an amount of rotation and a direction of rotation of the output shaft; and
    a controller to control rotation of the inner rotor brushless DC motor, the controller obtaining a target drive signal of the inner rotor brushless DC motor externally and a detection signal from the rotation detector, the controller outputting a signal to the driver, wherein:
    the controller controls a speed of rotation of the inner rotor brushless DC motor by varying the signal output to the driver based on the target drive signal and the detection signal,
    the controller obtains a target number of revolutions per unit time and a target total number of revolutions based on the target drive signal and obtains a number of motor revolutions per unit time and a total number of motor revolutions based on the detection signal, and
    the controller controls at least one of the speed of rotation and a position of rotation of the inner rotor brushless DC motor by varying the signal output to the driver to cause the target number of revolutions per unit time to be equal to the number of motor revolutions per unit time and to cause the target total number of revolutions to be equal to the total number of motor revolutions.

2. The drive unit according to claim 1, wherein the rotation detector is a two-channel rotary encoder provided with an encoder disk having no more than 200 pulses per cycle.

3. The drive unit according to claim 2, wherein the number of pulses per cycle of the encoder disk is one of 12 □ N pulses and 50 □ N pulses, where N is a natural number.

4. The drive unit according to claim 2, wherein the encoder disk is made of a metallic material.

5. The drive unit according to claim 2, wherein the encoder disk has slit-shaped scales formed thereon and the rotation detector detects an amount of movement thereof by detecting the slit-shaped scales.

6. The drive unit according to claim 1, further comprising a drive transmission unit attached to the output shaft of the inner rotor brushless DC motor,
    wherein the rotation detector is disposed at a side opposite a side to which the drive transmission unit attached and the encoder disk is fixedly mounted on the output shaft of the inner rotor brushless DC motor.

7. The drive unit according to claim 1, wherein the output shaft of the inner rotor brushless DC motor is supported by ball bearings.

8. The drive unit according to claim 7, wherein the inner rotor brushless DC motor uses a Hall integrated circuit.

9. The drive unit according to claim 1, wherein the output shaft of the inner rotor brushless DC motor includes gear teeth.

10. An image forming apparatus, comprising the drive unit according to claim 1.

11. A peripheral device disposed to an image forming apparatus, the peripheral device comprising the drive unit according to claim 1.

12. A control method for a drive unit, comprising:
    supplying power to drive an inner rotor brushless DC motor;
    detecting a number of rotations and a direction of rotation of the output shaft of the inner rotor brushless DC motor provided in the drive unit;
    obtaining a target drive signal of the inner rotor brushless DC motor externally and a detection signal;
    outputting a signal;
    varying the output signal based on the target drive signal and the detection signal;
    obtaining a target number of revolutions per unit time and a target total number of revolutions based on the target drive signal;

obtaining a number of motor revolutions per unit time and a total number of motor revolutions based on the detection signal;

causing the target number of revolutions per unit time to be equal to the number of motor revolutions per unit time; and causing the target total number of revolutions to be equal to the total number of motor revolutions.

\* \* \* \* \*